5

United States Patent Office
3,016,407
Patented Jan. 9, 1962

3,016,407
TELOMERS FROM $CH_2=CH_2$ AND $ICF_2CF_2I$
Neal O. Brace, Wilmington, Del., assignor to E. I. du Pont de Nemours and Company, Wilmington, Del., a corporation of Delaware
No Drawing. Filed Sept. 21, 1960, Ser. No. 57,388
6 Claims. (Cl. 260—653.1)

This invention is directed to the thermal addition of $ICF_2CF_2I$ to ethylene. This reaction gives a series of products $ICF_2CF_2(CH_2CH_2)_n \cdot I$ and $$I(CH_2CH_2)_nCF_2CF_2(CH_2CH_2)_nI$$

wherein $n$ is usually one or two but may be larger.

The thermal addition of perfluoroalkyl iodides $C_nF_{2n+1}I$ to ethylene was first disclosed by Haszeldine, J. Chem. Soc., 1949, 2856. 1,2-diiodotetrafluoroethane has been known for some time [Raasch, U.S. 2,424,677, Coffman et al., J. Org. Chem., 14, 747 (1949)] but telomerization reactions of this compound with nonfluorinated olefins have never been reported.

It is an object of this invention to prepare products of structure $ICF_2CF_2(CH_2CH_2)_nI$ and $$I(CH_2CH_2)_mCF_2CF_2(CH_2CH_2)_nI$$

wherein $m$ and $n$ are integers from 1 to about 5. It is a further object of this invention to provide a process for the thermal addition of $ICF_2CF_2I$ to ethylene to produce the heretofore-described products.

These and other objects will become apparent in the following description and claims.

The products of the present invention are prepared by heating 1,2-diiodotetrafluoroethane with ethylene under pressure, preferably in the presence of a small amount of tetrafluoroethylene.

More specifically, the present invention is directed to compounds of structure $ICF_2CF_2(CH_2CH_2)_nI$ and $$I(CH_2CH_2)_mCF_2CF_2(CH_2CH_2)_nI$$

wherein $m$ and $n$ are integers of from one to about 5. The present invention also encompasses the process for preparing said compounds which process comprises heating 1,2-diiodotetrafluoroethane with ethylene at a temperature of from about 180° C. to about 220° C. and a pressure of from about one atmosphere to about 700 atmospheres and recovering said compounds. A preferred embodiment is one wherein about 0.1 mole of tetrafluoroethylene per mole of $ICF_2CF_2I$ is added to the reaction mixture.

Although it may seem obvious to extrapolate from $C_nF_{2n+1}I$ to $ICF_2CF_2I$ so far as thermal additions to ethylene are concerned, it is not actually the case. The discoverers of $ICF_2CF_2I$ have shown that the compound is not thermally stable; it decomposes to iodine and tetrafluoroethylene. The same effect is observed when the compound is exposed to ultraviolet light. The known instability would lead to the conclusion that $ICF_2CF_2I$ would not be suitable as a telogen in radical additions to olefins such as ethylene. This conclusion is actually correct in two cases, the photochemical reaction and the reaction catalyzed by free radical generating compounds. In both cases, iodine and tetrafluoroethylene are formed. Small yields of products can be obtained in a few cases, none in others. It is surprising therefore that $ICF_2CF_2I$ will undergo thermal addition to ethylene in spite of its known thermal instability.

The process of the present invention is carried out by heating a mixture of $ICF_2CF_2I$ and ethylene at a temperature of from 180 to 220° C. under pressure. The concentration of ethylene present is determined by the ethylene pressure, higher pressures meaning greater concentration. The reaction produces two types of products, i.e., $$ICF_2CF_2I + C_2H_4 \rightarrow ICF_2CF_2CH_2CH_2I$$
$$+ ICH_2CH_2CF_2CF_2CH_2CH_2I + \text{higher telomers}$$

Increasing ethylene pressure increases the amount of di and higher adducts formed at the expense of the mono adduct. Conversion of $ICF_2CF_2I$ is not greatly affected.

A side reaction resulting from decomposition of $ICF_2CF_2I$ to $C_2F_4$ and $I_2$ occurs leading to the formation of $ICH_2CH_2I$. This reaction is not serious, accounting at most for 10% of the $ICF_2CF_2I$. It is readily overcome by including a 10 mole percent excess of $C_2F_4$ in the initial reaction mixture. Under these conditions little or no decomposition occurs. This is the preferred method of operation in both batch and continuous systems.

The reaction is best carried out at about 200° C. At temperatures below about 180° C., little or no reaction occurs while at temperatures much greater than 220° C., decomposition of $ICF_2CF_2I$ becomes uncontrollable even in the presence of excess $C_2F_4$.

The diiodide reactant $ICF_2CF_2I$ can be used as such in the reaction or it can be preformed by causing a mixture of $I_2$ and $C_2F_4$ to react at about 150° C. before ethylene is added to the system. Each method has advantages and disadvantages. In a batch system, it is simpler, and preferred, to form $ICF_2CF_2I$ from $I_2$ and $C_2F_4$ in the reaction vessel, eliminating the separate step of isolating $ICF_2CF_2I$. In a continuous system, preformed $ICF_2CF_2I$ must be used. It is not possible to form $ICF_2CF_2I$ in situ in a one-stage continuous system since $I_2$ and ethylene would, by necessity, be brought together, resulting in the formation of considerable $ICH_2CH_2I$, an undesirable by-product.

The following representative examples illustrate the present invention.

*Example 1*

1,2-diiodotetrafluoroethane [180 g., 0.51 mole] was placed in a 400-ml. Hastelloy C shaker tube. Ethylene [58 g., 2.07 mole] was compressed into the tube. The mixture was heated at 150° C. for one hour [pressure 1500 p.s.i.g., no change]. Thus no reaction occurred at 150° C. Then, the reaction mixture was heated at 200° C. for five hours [pressure 1750 p.s.i.g., decreased to 1250 p.s.i.g.]. The products [181 g.] were separated by distillation giving $ICF_2CF_2CH_2CH_2I$, B.P. 71°/10 mm., 59°/5.0 mm., $n_D^{25}$ 1.509. [25% conversion], $$ICH_2CH_2CF_2CF_2CH_2CH_2I$$

M.P. 112.5–113.5° C. [67% conversion] and $ICH_2CH_2I$, M.P. 82–83° C. [5–10% conversion].

Analysis of $ICF_2CF_2CH_2CH_2I$.—Calc'd. for $C_4H_4F_4I_2$: C, 12.58; H, 1.05; F, 19.9; I, 66.6. Found: C, 12.4; H, 1.4; F, 17.0; I, 67.9.

Analysis of $ICH_2CH_2CF_2CF_2CH_2CH_2I$.—Calc'd. for $C_6H_8F_4I_2$: C, 17.58; H, 1.95; F, 18.5; I, 61.9. Found: C, 17.6; H, 2.0; F, 18.2; I, 61.7.

$ICH_2CH_2I$ is a known compound [Beilstein, 4th ed., vol. I, p. 99, M.P. 81–82° C.].

*Example 2*

Using the same procedure as Example 1, 180 g. [0.51 mole] of $ICF_2CF_2I$ and 58 g. [2.07 mole] of ethylene were heated at 150° C. for 1 hour [pressure 1450 p.s.i.g., no change]. The mixture was then heated at 200° C. for 5 hours [pressure 1750 p.s.i.g., decreased to 1225 p.s.i.g.]. The product [178 g.] was separated as before giving $ICF_2CF_2CH_2CH_2I$ [37% conversion], $$ICH_2CH_2CF_2CF_2CH_2CH_2I$$

[40% conversion], $ICH_2CH_2I$ [6.4% conversion] and $ICF_2CF_2I$ [4.5% recovery].

Example 3

A mixture of $ICF_2CF_2I$ [180 g., 0.51 mole], ethylene [58 g., 2.07 mole] and tetrafluoroethylene [5.0 g., 0.05 mole] was heated at 150° C. for 1 hour in a 400-ml. Hastelloy C shaker tube [pressure 1450 p.s.i.g., no change]. The mixture was then heated at 200° C. for five hours [pressure 1760 p.s.i.g., decreased to 1160 p.s.i.g.]. The product [192 g.] was separated as before giving $ICF_2CF_2CH_2CH_2I$ [32.5% conversion],

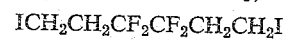
$ICH_2CH_2CF_2CF_2CH_2CH_2I$

[52.1% conversion], $ICH_2CH_2I$ [1.3% conversion] and $ICF_2CF_2I$ [14.1% recovery].

By comparing this example with Examples 1 and 2, it is readily apparent that the conversion to $ICH_2CH_2I$, the undesired by-product, has been considerably decreased.

Example 4

A mixture of iodine [127 g., 0.5 mole] and tetrafluoroethylene [55 g., 0.55 mole] was placed in a 400-ml. Hastelloy shaker tube and heated at 150° C. for 0.5 hour [pressure 180 p.s.i.g., decreases to 0 p.s.i.g.]. Then ethylene was compressed into the shaker tube to 2000 p.s.i.g. at 150° C. The mixture was then heated at 200° C. for 6.5 hours [pressure 2850 p.s.i.g., decreases to 1600 p.s.i.g.]. The product [225 g.] was separated as before giving $ICF_2CF_2CH_2CH_2I$ [9% conversion],

$ICH_2CH_2CF_2CF_2CH_2CH_2I$

[79% conversion], $I(CH_2CH_2)_2CF_2CF_2CH_2CH_2I$ [6% conversion] and $ICF_2CF_2I$ [15.3% recovery]. No $ICH_2CH_2I$ was formed.

The product $I(CH_2CH_2)_2CF_2CF_2CH_2CH_2I$ had a M.P. of 67–68° C.

*Analyis.*—Calc'd. for $C_8F_4H_{12}I_2$: C, 21.9; H, 2.77; F, 17.4; I, 58.0. Found: C, 21.1; H, 3.0; F, 17.6; I, 56.3.

The following examples illustrate the attempted reaction using a free radical generating catalyst.

Example 5

A mixture of $ICF_2CF_2I$ [90 g., 0.25 mole], ethylene [58 g., 2.07 mole] and di-tert-butyl peroxide [1.0 g.] was heated for 8 hours at 140° C. [pressure 1250 p.s.i.g., no change]. The liquid product [88 g.] consisted of a 98% recovery of $ICF_2CF_2I$.

Similar experiments were carried out at 70° C. with 2,2'-azobisisobutyronitrile using $ICF_2CF_2I$ and hexene-1, hexyne-1 and vinyl acetate. In each case, only the starting materials could be isolated. It is known that monoiodides react in high conversion with ethylene under these conditions.

When the reactions were repeated at 115–120° C., $ICF_2CF_2I$ decomposed. When the reaction with vinyl acetate and azonitrile was repeated using an excess of tetrafluoroethylene, no reaction occurred again.

The products of the present invention are useful for a number of purposes. They can be converted to other difunctional derivatives such as alcohols by well-known reactions. They may also be converted to olefins which are useful in preparing fluorine containing polymers.

Example 6

1,6-diiodo-3,3,4,4-tetrafluorohexane [41 g., 0.1 mole] and tri-n-butylamine [74.2 g., 0.4 mole] were heated on a flask attached to an efficient fractional distillation column. The diolefin $CH_2=CH(CF_2)_2CH=CH_2$, B.P. 72–73° distilled from the reaction mixture at a 10/1 reflux ratio when the reaction temperature reached 200° C. [11.4 g., 75%]. A higher boiling product, B.P. 120–125°, $n_D^{25}$ 1.4171 [1.5 g.] was also isolated.

*Analysis.*—Calc'd. for $C_6H_6F_4$: C, 46.7; H, 3.9. Found: C, 46.9; H, 4.3.

The diolefin forms peroxides readily on standing.

It is apparent from the foregoing that the present process is a convenient and highly successful method for preparing compounds of type $ICF_2CF_2(CH_2CH_2)_mI$ and $I(CH_2CH_2)_nCF_2CF_2(CH_2CH_2)_mI$ and the products are valuable compounds as intermediates for a variety of useful compounds.

For example, the product $ICH_2CH_2CF_2CF_2CH_2CH_2I$ is readily converted to the corresponding alcohol by reaction with silver acetate followed by hydrolysis using the procedures described by Park et al. for $C_3F_7CH_2CH_2I$, J. Org. Chem., 23, 1166 (1958). The diols are then esterified with perfluorodicarboxylic acids to give polyesters. Such esters are useful high temperature lubricants (see Baranauckas et al., U.S. 2,911,444; Nov. 3, 1959, who describe lubricants and elastomers prepared from

$HOCH_2(CF_2)_nCH_2OH)$

Reaction of diiodide with silver acrylate gives the diacrylate ester

$CH_2=CHCO_2CH_2CH_2CF_2CF_2CH_2CH_2O_2CCH=CH_2$

This monomer undergoes ready polymerization and can be used for crosslinking acrylate polymers prepared from perfluoroalkylacrylates such as $CH_2=CHCO_2CH_2C_7F_{15}$ (polymers and copolymers of this monomer are described by Ahlbrecht et al., U.S. 2,642,416).

The diolefin $CH_2=CHCF_2CF_2CH=CH_2$ is readily oxidized by known methods, for example with potassium permanganate, to $HO_2CCF_2CF_2CO_2H$, a perfluorodicarboxylic acid, which may be used to prepare the polyester lubricants described above.

It is understood that the preceding examples may be varied within the scope of one skilled in the art to produce the described results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the group consisting of those compounds having the structure

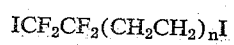
$ICF_2CF_2(CH_2CH_2)_nI$ and $I(CH_2CH_2)_mCF_2CF_2(CH_2CH_2)_nI$ in which structures $m$ and $n$ are integers having a value within the range of from 1 to 5.

2. A process for preparing a compound selected from the group consisting of those compounds having the structure $ICF_2CF_2(CH_2CH_2)_nI$ and

$I(CH_2CH_2)_mCF_2CF_2(CH_2CH_2)_nI$ which process comprises heating 1,2-diiodotetrafluoroethane with ethylene at a temperature of from about 180° C. to about 200° C. at a pressure of from about 1 to 700 atmospheres followed by recovering the compounds produced.

3. The process of claim 2 wherein about 0.1 mole of tetrafluoroethylene per mole of $ICF_2CF_2I$ is added to the reaction mixture.

4. The compound $ICF_2CF_2CH_2CH_2I$.
5. The compound $ICH_2CH_2CF_2CF_2CH_2CH_2I$.
6. The compound $ICH_2CH_2CF_2CF_2(CH_2CH_2)_2I$.

No references cited.